United States Patent
Ng et al.

(10) Patent No.: US 10,717,265 B2
(45) Date of Patent: Jul. 21, 2020

(54) ARRAY OF PRINTHEAD MODULES FOR ADDITIVE MANUFACTURING SYSTEM

(71) Applicant: Applied Materials, Inc., Santa Clara, CA (US)

(72) Inventors: Hou T. Ng, Campbell, CA (US); Raanan Zehavi, Cupertino, CA (US); Nag B. Patibandla, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 156 days.

(21) Appl. No.: 15/266,494

(22) Filed: Sep. 15, 2016

(65) Prior Publication Data
US 2017/0072644 A1     Mar. 16, 2017

Related U.S. Application Data

(60) Provisional application No. 62/219,605, filed on Sep. 16, 2015, provisional application No. 62/263,475, filed on Dec. 4, 2015.

(51) Int. Cl.
    *B29C 64/20*         (2017.01)
    *B33Y 40/00*         (2020.01)
    (Continued)

(52) U.S. Cl.
    CPC .......... *B33Y 40/00* (2014.12); *B29C 64/112* (2017.08); *B29C 64/153* (2017.08);
    (Continued)

(58) Field of Classification Search
    None
    See application file for complete search history.

(56) References Cited

U.S. PATENT DOCUMENTS

| | | |
|---|---|---|
| 6,092,941 A | 7/2000 | Imai |
| 8,454,345 B2 | 6/2013 | Silverbrook |
| (Continued) | | |

FOREIGN PATENT DOCUMENTS

| | | |
|---|---|---|
| CN | 102463746 | 5/2012 |
| CN | 203344320 | 12/2013 |
| (Continued) | | |

OTHER PUBLICATIONS

International Search Report and Written Opinion in International Application No. PCT/US2016/051883, dated Dec. 21, 2016, 10 pages.

(Continued)

*Primary Examiner* — Matthew J Daniels
*Assistant Examiner* — Mohammad M Ameen
(74) *Attorney, Agent, or Firm* — Fish & Richardson P.C.

(57) ABSTRACT

An additive manufacturing system includes a platen having a top surface to support an object being manufactured, a support structure, an actuator coupled to at least one of the platen or the support structure to create relative motion there between along a first axis parallel to the top surface, a plurality of printheads mounted on the support structure, and an energy source. Each printhead includes a dispenser to deliver a plurality of successive layers of feed material over the platen. The printheads are spaced along a second axis perpendicular to the first axis such that during motion along the first axis the plurality of printheads dispense feed material in a plurality of parallel swaths along the first axis. The energy source is configured to fuse at least a portion of the feed material.

19 Claims, 12 Drawing Sheets

(51) Int. Cl.
*B33Y 30/00* (2015.01)
*B33Y 50/02* (2015.01)
*B29C 64/112* (2017.01)
*B29C 64/386* (2017.01)
*B29C 64/153* (2017.01)
*B29C 64/165* (2017.01)

(52) U.S. Cl.
CPC .......... *B29C 64/165* (2017.08); *B29C 64/386* (2017.08); *B33Y 30/00* (2014.12); *B33Y 50/02* (2014.12)

(56) References Cited

U.S. PATENT DOCUMENTS

| | | | |
|---|---|---|---|
| 9,764,515 B2 | 9/2017 | Yost et al. | |
| 2004/0175451 A1* | 9/2004 | Maekawa | B29C 41/36 425/144 |
| 2005/0158107 A1 | 7/2005 | Acher | |
| 2005/0191016 A1 | 9/2005 | Ishikawa | |
| 2005/0280185 A1 | 12/2005 | Russell et al. | |
| 2008/0250953 A1 | 10/2008 | Whelan | |
| 2010/0278952 A1* | 11/2010 | Silverbrook | B22F 3/008 425/101 |
| 2013/0001834 A1 | 1/2013 | El-Siblani et al. | |
| 2014/0175708 A1* | 6/2014 | Echigo | B22F 3/1055 264/460 |
| 2014/0271328 A1* | 9/2014 | Burris | B23K 26/034 419/53 |
| 2015/0014885 A1* | 1/2015 | Hofmann | B29C 67/0055 264/294 |
| 2015/0035186 A1* | 2/2015 | Teken | B41J 2/14145 264/40.4 |
| 2015/0174824 A1 | 6/2015 | Gifford et al. | |
| 2015/0190963 A1* | 7/2015 | Lee | B29C 67/0059 425/375 |
| 2016/0136895 A1 | 5/2016 | Beyer et al. | |
| 2016/0207263 A1 | 7/2016 | Gordon | |
| 2017/0021456 A1 | 1/2017 | Varetti | |
| 2017/0036404 A1 | 2/2017 | Rengers et al. | |
| 2017/0057013 A1 | 3/2017 | Gillespie | |
| 2017/0072643 A1* | 3/2017 | Ng | B29C 64/153 |
| 2019/0351667 A1 | 11/2019 | Ng et al. | |

FOREIGN PATENT DOCUMENTS

| | | |
|---|---|---|
| CN | 103717378 | 4/2014 |
| CN | 204235896 | 4/2015 |
| CN | 104708819 | 6/2015 |
| CN | 105579219 | 5/2016 |
| EP | 1201404 | 5/2002 |
| EP | 1631439 | 8/2007 |
| JP | 2006 205456 | 8/2006 |
| JP | 2015-139957 | * 8/2015 |
| WO | WO 98/28124 | 7/1998 |
| WO | WO 2008/120183 | 10/2008 |
| WO | WO 2009-013751 | 1/2009 |
| WO | WO 2011/045291 | 4/2011 |
| WO | WO 2015/038072 | 3/2015 |
| WO | WO 2015/094720 | 6/2015 |
| WO | WO 2015/106838 | 7/2015 |

OTHER PUBLICATIONS

International Search Report and Written Opinion in International Application No. PCT/US2016/051760, dated Dec. 14, 2016, 11 pages.
Extended European Search Report in Application No. 16847244.7, dated Apr. 18, 2019, 8 pages.
Extended European Search Report in Application No. 16847279.3, dated Apr. 18, 2019, 7 pages.
Office Action in Chinese Application No. 201680052198.5, dated Jun. 24, 2019, 9 pages (with English translation).
Office Action in Chinese Application No. 201680054039.9, dated May 22, 2019, 11 pages (with English translation).
CN Office Action in Chinese Application No. 201680052198.5, dated Apr. 3, 2020, 10 pages (with English Translation).

* cited by examiner

ARRAY OF PRINTHEAD MODULES FOR ADDITIVE MANUFACTURING SYSTEM

CROSS-REFERENCE TO RELATED APPLICATIONS

This application claims priority to U.S. Provisional Application Ser. No. 62/263,475, filed on Dec. 4, 2015, and claims priority to U.S. Provisional Application Ser. No. 62/219,605, filed Sep. 16, 2015, the entirety of each being incorporated by reference.

TECHNICAL FIELD

This invention relates to additive manufacturing, and more particularly to a 3D printing process in which a layer of powder is dispensed.

BACKGROUND

Additive manufacturing (AM), also known as solid freeform fabrication or 3D printing, refers to any manufacturing process where three-dimensional objects are built up from raw material (generally powders, liquids, suspensions, or molten solids) in a series of two-dimensional layers or cross-sections. In contrast, traditional machining techniques involve subtractive processes and produce objects that are cut out of a stock material such as a block of wood or metal.

A variety of additive processes can be used in additive manufacturing. The various processes differ in the way layers are deposited to create the finished objects and in the materials that are compatible for use in each process. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g. stereolithography (SLA).

Sintering is a process of fusing small grains, e.g., powders, to create objects. Sintering usually involves heating a powder. When a powdered material is heated to a sufficient temperature in a sintering process, the atoms in the powder particles diffuse across the boundaries of the particles, fusing the particles together to form a solid piece. In contrast to melting, the powder used in sintering need not reach a liquid phase. As the sintering temperature does not have to reach the melting point of the material, sintering is often used for materials with high melting points such as tungsten and molybdenum. Both sintering and melting can be used in additive manufacturing.

Conventional powder-based additive manufacturing systems can deposit a layer of powdered material on a stage. A laser beam or electron beam is used as the energy source for sintering or melting the powdered material and typically the beam is directed on a selected point in a layer of the powdered material and raster scanned with activation at selected locations across the layer. Once all the selected locations on the first layer are sintered or melted, the stage is lowered and a new layer of powdered material is deposited on top of the completed layer, and the process is repeated layer by layer until the desired object is produced.

SUMMARY

In one aspect, an additive manufacturing system includes a platen having a top surface to support an object being manufactured, a support structure, an actuator coupled to at least one of the platen or the support structure to create relative motion there between along a first axis parallel to the top surface, a plurality of printheads mounted on the support structure, and an energy source. Each printhead includes a dispenser to deliver a plurality of successive layers of feed material over the platen. The printheads are spaced along a second axis perpendicular to the first axis such that during motion along the first axis the plurality of printheads dispense feed material in a plurality of parallel swaths along the first axis. The energy source is configured to fuse at least a portion of the feed material.

Features may include one or more of the following. The platen may have a build width and the plurality of printheads may be arranged such that the plurality of parallel swaths of feed material span the build width. The plurality of printheads may be arranged in a staggered array with portions of the printheads overlapping along the second axis. The staggered array may include a first column including a first printhead having a first dispenser and a second column including a second printhead having a second dispenser.

The first dispenser may include a first dispensing region and the second dispenser may include a second dispensing region arranged such that the first region and the second region abut without overlapping along the second axis. The first dispenser may include a first dispensing region and the second dispenser may include a second dispensing region arranged such that the first region and the second region overlap along the second axis.

A spreader, a blade and/or a roller, may spread feed material delivered to an area where the first region and the second region overlap. The spreader may include.

The first dispenser may include a first plurality of independently controllable openings and the second dispenser includes a second plurality of independently controllable openings, and a controller may be configured to cause the openings of the first dispenser and the second dispenser to dispense in regions that do not overlap along the second axis.

The plurality of printheads may be arranged side-by-side. The dispensing region of adjacent printheads may be separated along the second axis by a gap. A spreader, e.g., a blade and/or a roller, may spread feed material delivered by the dispensers into the gap.

The plurality of printheads may include a first printhead and a second printhead adjacent to the first printhead. The first printhead may include a first dispenser and the second printhead may include a second dispenser, and each of the first dispenser and second dispenser may be configured to dispense feed material at a higher rate at a first region adjacent the gap than at a second region farther from the gap. The first dispenser may include a first plurality of independently controllable openings and the second dispenser may include a second plurality of independently controllable openings, and a controller may be configured to cause the openings of the first dispenser and the second dispenser to dispense at a higher rate in the first region than the second region.

The energy source may include a plurality of energy sources, and each respective printhead may include a respective energy source from the plurality of energy sources. Each respective energy source may be configured to fuse the feed material in the swath dispensed by the respective printhead. The energy source may be mounted to the support separately from the printheads.

A heat source may be configured to heat the feed material to a temperature below a temperature at which particles of the feed material fuse. The heat source may include a plurality of heat sources, and each respective printhead may include a respective heat source from the plurality of heat sources. Each respective heat source may be configured to heat the feed material in the swath dispensed by the respective printhead. The heat source may be mounted to the support separately from the printheads.

A spreader may be configured to smooth the feed material dispensed over the platen. The spreader may include a blade and/or a roller. The spreader may include a plurality of spreaders, and each respective printhead may includes a respective spreader from the plurality of spreaders configured to smooth the feed material in the swath dispensed by the respective printhead. The spreader may be mounted to the support separately from the printheads.

The plurality of printheads may include a first plurality of first printheads and a second plurality of second printheads, each first printhead including a first dispenser and each second printhead including a second dispenser. The first plurality of printheads may be spaced along the second axis, the second plurality of printheads may be spaced along the second axis and spaced apart from the first plurality of printheads along the first axis, and each first dispenser of the first plurality of printheads may have a first dispensing region that overlaps a corresponding second dispensing region of a corresponding second dispenser of the second plurality of printheads. Each first dispenser may have a first plurality of apertures and each second dispenser may have a second plurality of apertures.

The first plurality of apertures may be aligned with the second plurality of apertures along the second axis. The first dispenser may include a reservoir to hold a first feed material and the second dispenser may include a reservoir to hold a second feed material. The first material may be a first powder having a first particle size and the second material may be a second powder having a second particle size smaller than the first particle size. The first material and the second material may have the same material composition, or the first material and the second material may have different material compositions.

Each first dispenser may includes a first plurality of independently controllable openings and each second dispenser may includes a second plurality of independently controllable openings, and a controller may be configured to control the openings of the first dispenser and the second dispenser. The controller may be configured to cause the first dispenser to dispense the first feed material into a plurality of voxels and to cause the corresponding second dispenser to dispense the second feed material into voxels into which the first dispenser did not dispense the first feed material. The first material may be a first powder having a first fusing temperature and the second material may be a second powder having a different second fusing temperature. An energy source may be mounted to the support or a frame holding the support and the platen, and the energy source configured to fuse the feed material after both the first powder and second powder are dispensed.

The controller may be configured to cause the first dispenser to dispense the first feed material into a plurality of voxels and to cause the corresponding second dispenser to dispense the second feed material into a subset of the plurality of voxels into which the first dispenser dispensed the first feed material. The first material may be a first powder having a first particle size and the second material may be a second powder having a second particle size smaller than the first particle size. The subset of the plurality of voxels may be voxels at an edge of the object being manufactured.

The first plurality of apertures may be aligned with spaces between the second plurality of apertures along the second axis. Each first dispenser may include a first plurality of independently controllable openings and each second dispenser may include a second plurality of independently controllable openings, and a controller may be configured to control the openings of the first dispenser and the second dispenser. The controller may be configured to divide data representing voxels of a layer in a 3D model into a first data representing a first plurality of parallel strips of voxels corresponding to the first plurality of openings and second data representing a second plurality of parallel strips of voxels interleaved with the first plurality of parallel strips and corresponding to the second plurality of openings and to control the first plurality of openings based on the first data and control the second plurality of openings based on the second data. The first dispenser may include a first reservoir and the second dispenser may include a second reservoir, and the first reservoir and second reservoir may hold the same feed material.

Advantages of the foregoing may include but are not limited to the following. An additive manufacturing process can be scalable. For example, the build bed size of the manufacturing process can be increased, or the processing time can be decreased. These goals can be achieved by scaling the number of components of an additive manufacturing system that carries out the manufacturing process. For example, one or more components, e.g., a dispenser, can form a unit called a printhead module that can be added to or removed from the manufacturing system. By changing the number of printhead modules, the manufacturing process can be scaled without requiring custom manufacturing of the dispenser. A layer of feed material can be dispensed with a single scan in one direction.

DETAILED DESCRIPTION

Additive manufacturing process is performed by various printing components that are included in a printhead platform. As the printhead platform moves over a support, one or more feed materials are deposited and processed by the various printing components. The printing components can be included in a printhead module that can be added or removed from the printhead platform as a single unit. Printing components can also be directly added to the printhead platform. By arranging the printhead modules and printing components of the printhead platform in various configurations, additive manufacturing process can be scaled to process larger build bed size, dispense same and/or different materials, decrease the processing time and/or improve the quality of the manufacturing process.

Figure 1A:
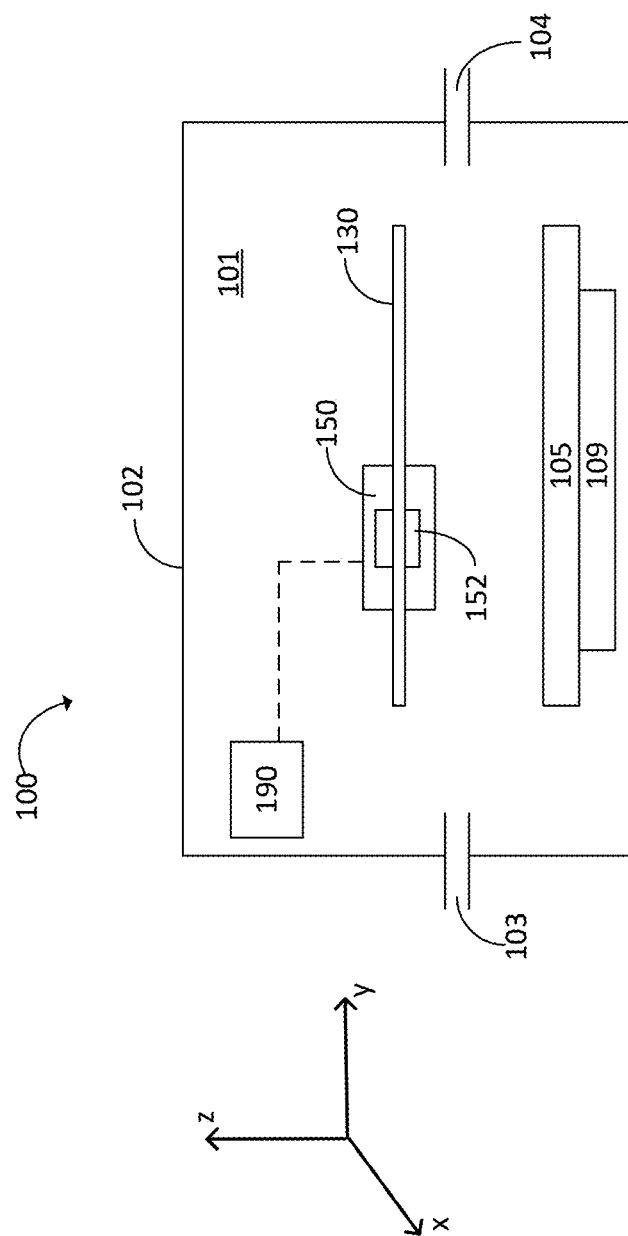
FIG. 1A illustrates a schematic side view of an exemplary additive manufacturing system.

FIG. 1A illustrates a schematic of an exemplary additive manufacturing system 100. The system 100 includes and is enclosed by a housing 102. The housing 102 can, for example, allow a vacuum environment to be maintained in a chamber 101 inside the housing, e.g., pressures at about 1 Torr or below. Alternatively the interior of the chamber 101 can be a substantially pure, inert, mixed gas, e.g., a gas that has been filtered to remove particulates, or the chamber can be vented to atmosphere or be held at a positive pressure above atmosphere. The gas can enter the chamber 101, from a gas source (not shown), through a gas inlet 103. The gas from the chamber can be removed through a vacuum vent 104.

The system 100 includes a platen 105 that receives or supports the layer of feed material. The platen 105 can include or be placed above a heater 109, e.g., a resistive heater or a lower lamp array, which can heat the platen 105 and thus heat the feed material deposited on the platen 105.

A printhead assembly that carries out the additive manufacturing process is positioned above the platen 105. The printhead assembly includes a support, such as a platform 150, is configured to carry one or more printhead modules 110 (see FIG. 1B). Each printhead module is removably mounted on the platform 150. "Removably mounted" in this context means that the printhead 110 can be installed such that the printhead 110 is mechanically held in a fixed position relative to the platform 150, but that the printhead 110 can be removed by use of standard hand-held construction tools, e.g., wrenches or power screwdrivers, and without damage to the printhead or the platform. For example, a frame of the printhead 110 can be secured by mechanical fasteners, e.g., nuts and bolts, to the platform 150. When an operator desires to remove the printhead 110, the bolts are loosened and the printhead is lifted out. In other implementations, printhead modules can be secured or removed from platform 150 via other mechanisms such as magnetism or lock and key mechanism. The securing and removal of modules can be performed by robotics.

The printhead platform 150 can be supported by a gantry 130. An actuator system 152 allows the printhead platform 150 to move across the platen 105 (for example, along the y-axis). The platform 150 and the platen 105 are separate from one another, and neither supports the other. For example, the platform 150 is not mounted on the platen 105.

A controller 190 controls various aspects of the additive manufacturing process. For example, the controller 190 controls the actuator system 152 and therefore the motion of the printhead platform 150. The controller 190 can also control the relative motion and operation of printhead modules 110 (see FIG. 1B) included in the printhead platform 150. The controller can also control the operation of various "global" printing components included in the printhead platform 150.

Figure 1B:
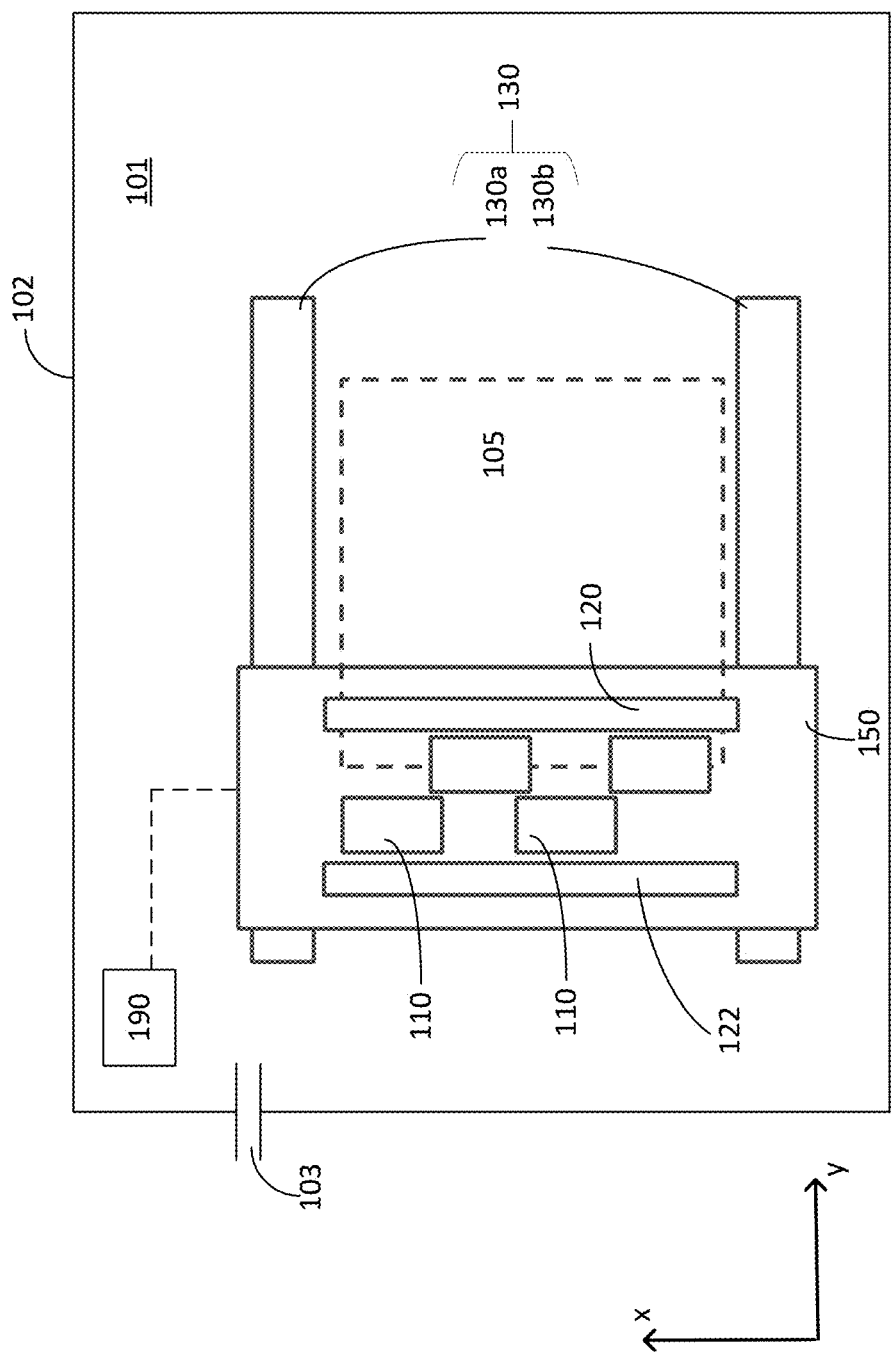
FIG. 1B is a top view of the additive manufacturing system illustrated in FIG. 1A.

FIG. 1B is a top view of the exemplary additive manufacturing system illustrated in FIG. 1A. The printhead platform 150 is mounted on two parallel rails 130a and 130b of the gantry 130. By sliding over the rails 130a and 130b of the gantry 130—for example, by an actuator—the printhead platform 150 can traverse over the platen 105 (along the y axis).

As shown in FIG. 1B, the printhead platform 150 includes one or more printhead modules 110 that are removably mounted on, and are a part of the platform 150. The printhead module 110 can include various 3D printing components, for example, feed material dispenser, spreader, heat source, energy source, metrology equipment and coolant dispenser. The printhead module is configured such that it can be mounted and dismounted as a single unit from the platform 150. This permits easier construction and repair of the additive manufacturing system 100. Further, the printing components can be removably mounted on a frame of the module 110. This can allow, for example, to replace or remove a printing component that needs repair or is not needed for the manufacturing process.

The various printhead modules 110 can be constructed to be interchangeable. For example, each feed material dispenser can be substantially identical in physical construction. More generally, each of the printhead modules 110 can be substantially identical in physical construction. In this context "substantially identical" indicates that the physical construction, e.g., dimensions of any frame and mechanism of connection of the frame to the platform, positioning of components such as the dispenser within the frame, location of feed material dispensing holes, is the same to within a sufficient tolerance that the printhead modules are interchangeable. This permits the manufacturing process to be scaled without requiring custom manufacturing of the components. It may be noted that "substantially identical" still permits some differences, such as a serial number printed or embedded in electronics of the printhead module, firmware version, and the like, that do not affect the ability to interchange the printhead modules.

As shown in FIG. 1B, the printhead modules 110 are arranged in a staggered fashion so as to span the entire width of the platen 105. This permits a layer of the object to be fabricated with a single pass of the platform 150 over the platen 105. The printhead modules 110 perform the additive manufacturing process on regions that form parallel stripes across the platen 105. It should be understood that if the dispenser has controllable openings, then the layer of feed material can be deposited by a dispenser in a desired pattern within the stripe associated with the printhead module.

The platform 150 can also support global printing components 120 and 122. These global printing components are mounted directly on the platform 150, rather than on the frame of a printhead 110. Printing component 120 can be a global dispenser that can dispense and smooth the deposited feed material. Printing component 120 and/or 122 can be a global metrology system that can measure various parameters associated with the additive manufacturing process. The global metrology system can comprise one or more of a sensor, a thermal imager or an optical camera. Further, printing components 120 or 122 or both, can be energy sources to heat the deposited feed material. For example, feed material dispensers in modules 110 can deposit the feed material, and energy sources in 120 and 122 can fuse the deposited feed material.

In one implementation, as the platform 150 moves from left to right (along +y direction) across the platen 105, a first global metrology system 120 forms the leading edge of the system, followed by the printhead modules 110 which in turn are followed by a second global metrology system 122 at the end. The global metrology system 120 at the leading edge of the system 150 can therefore measure the various parameters such as the temperature and/or vertical position of the surface, e.g., the platen or an underlying layer, onto which the layer will be deposited. This data can be fed to the controller 190 to control operation of the printhead modules 110. For example, if the feed material dispenser is controllable, measurements of the height of the surface can be used by the controller to determine an amount of material to dispense to improve layer thickness uniformity. Similarly, the data on the temperature of the layer can be used to control the power delivered to the heat source and/or energy source so that the portions to be fused are raised to a uniform temperature. The global metrology system 122 at the trailing edge of the system 150 can measure the various parameters associated with the additive manufacturing process, for example, the temperature and/or surface roughness of the fused/melted feed material. Again, this data can be fed to the controller 190 to control operation of the printhead modules 110, e.g., in a feedback loop to provide improved uniformity.

In some implementations, the global metrology system 122 can be divided into several segments along the x direction such that each segment of the metrology system is responsible for taking measurements of feed material fused by one or more printhead modules.

In some implementations, the additive manufacturing process can be one-directional, i.e., the additive manufacturing process only occurs when the system 150 is moving from left to right or from right to left. In another example, the additive manufacturing process can be bi-directional, i.e., the additive manufacturing process occurs when the system 150 is moving both from left to right and from right to left. The various implementations of additive manufacturing systems with one or more modules 110 and global printing components will be discussed in detail later.

Figure 1C:
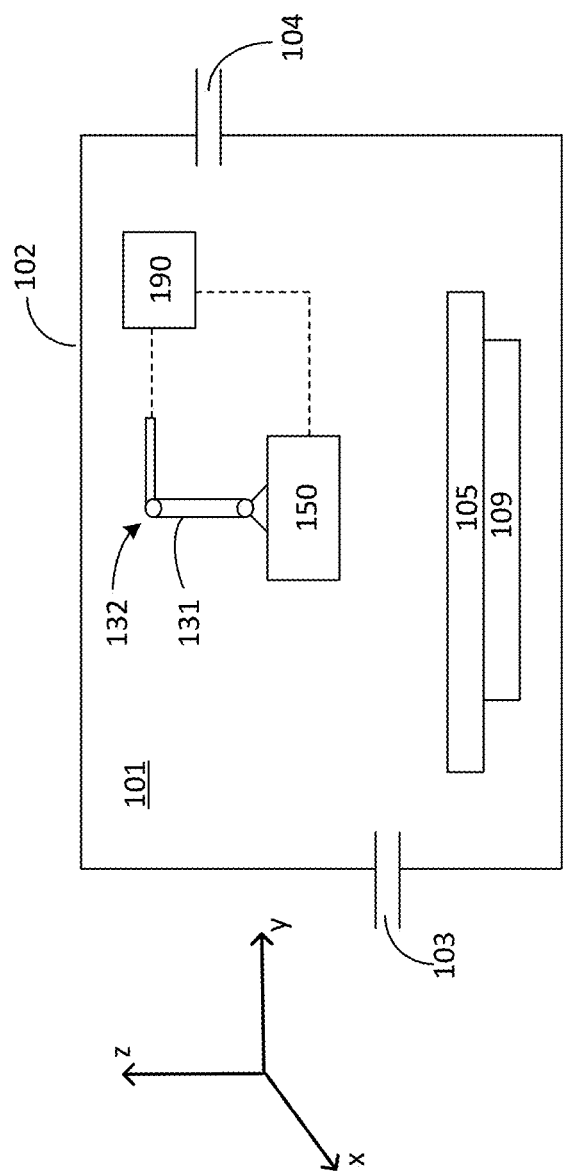
FIG. 1C illustrates a schematic side view of an exemplary additive manufacturing system.

FIG. 1C illustrates another implementation of a manufacturing system. This system is basically the same as the system of FIGS. 1A and 1B, but in FIG. 1C, the printhead platform 150 is attached to a robot arm 131 of a robot 132 that can move the printhead platform 150 over the platen 105. The robot arm 131 can rotate freely and controllably, for example, it can be rotated by 90 degrees around the z-axis, e.g., by up to 150 degrees. This can allow the additive manufacturing process to be performed along the x-axis. The robot arm 131 can be moved along the z-axis while a layer of feed material is being processed. This can result in an uneven profile of the feed material, for example, the feed material can have a sloped profile. Each printhead module 110 is removably mounted on the platform 150. The motion of the robot arm 131 is controlled by the controller 190.

In some implementations, the printhead platform 150 can be mounted in a cantilever arrangement. In a cantilever arrangement, the printhead platform 150 is held above the platen 105 by a support that supports just one end of the printhead platform. For example, unlike FIGS. 1A and 1B where the gantry 130 supports the printhead platform by two rails (130a and 130b), in a cantilever arrangement, only one edge of the printhead platform 150 that is parallel to the y-axis is supported by a support. The support can allow the platform 150 to move above the platen 105. As the platform moves, the printhead modules 110 that are removably attached to the platform 150 can carry out the additive manufacturing process. The edge of the platform 150, which is parallel to the y-axis and not supported by any support, can be attached to a second printhead platform. Such an arrangement can extend the additive manufacturing process along the x-axis allowing for bigger build bed sizes.

In some implementations, there is no platform, and instead the printhead modules are directly mounted to each other. In this case, the printhead module at one edge of the array (in the case of the cantilever arrangement) or the printhead modules at opposite edges of the array (in the case of gantry arrangement) are mounted on the support, e.g., a vertical support plate.

In some implementations, for example, the implementation described in FIGS. 1A-C, the printhead platform 150 and the platen 105 can move relative to each other along the z-axis. This can be achieved by either moving the printhead platform 150, or the platen 105, or both along the z-axis using one or more actuators or robot arms.

As a layer of feed material is deposited for processing on the platen 105, the distance between the deposited layer and the printhead platform 150 decreases by the thickness of the deposited layer. It may be desirable to keep the distance between the layer deposited for processing and the platform 150 constant during the additive manufacturing process. Doing so, for example, can improve the quality of the manufacturing process. Distance between the platform 150 and the layer of feed material can remain unchanged by moving the platform 150 relative to the platen 105 along the z-axis by the thickness of the deposited layer.

Figure 2:
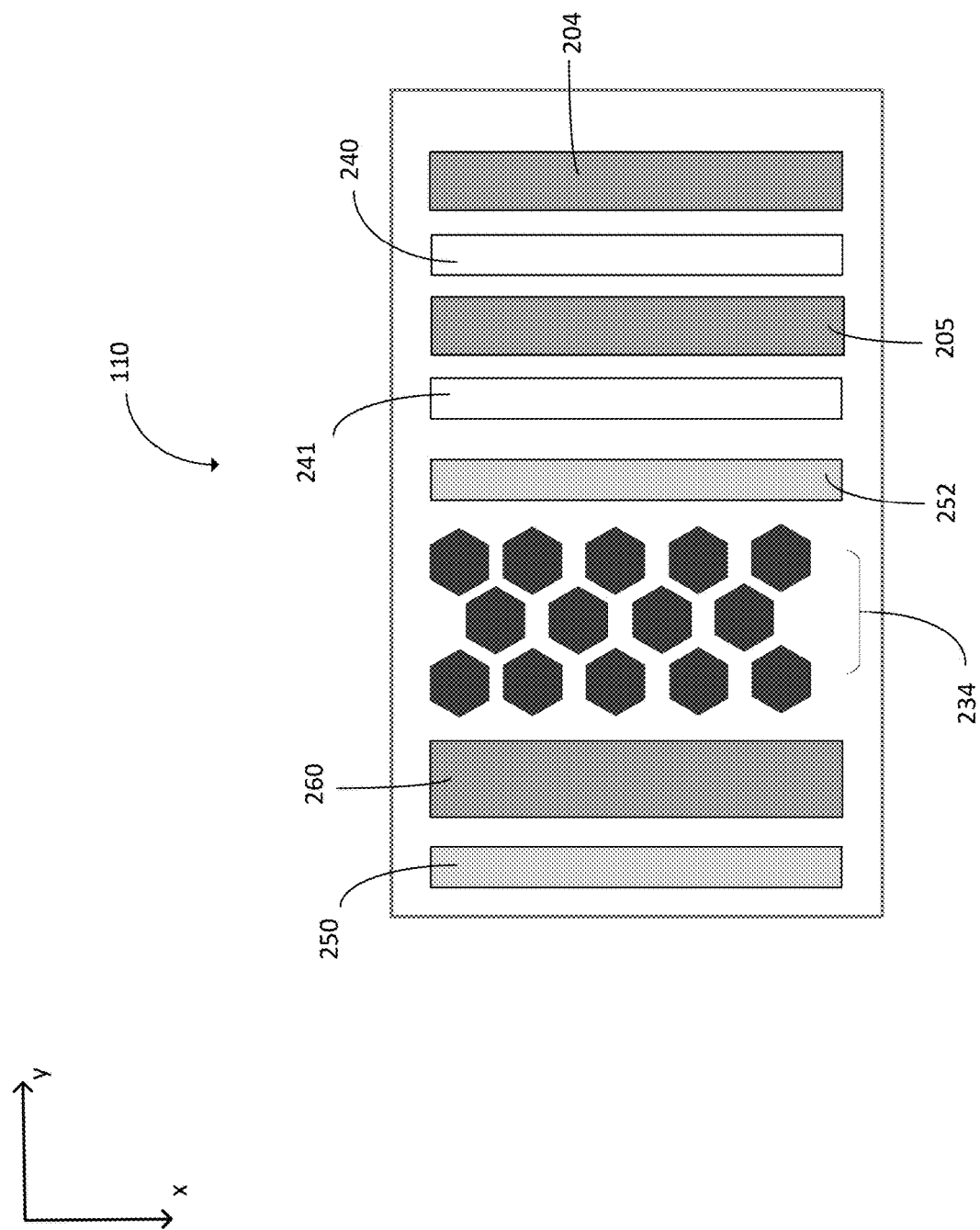
FIG. 2 illustrates a top view of a printhead module.

FIG. 2 illustrates a top view of an embodiment of printhead module 110 that is placed in the x-y plane above the platen (not shown). Because the module is configured to move from left to right over the platen (along +y direction), the right end of the module is the leading edge and the left end is the trailing edge. The module 110 includes a plurality of printing component. For example, the printing component include, in the order from leading edge to trailing edge, a first dispenser 204, a first spreader 240 (for example, a roller or a blade), a second dispenser 205, a second spreader 241 (for example, a roller or a blade), a first metrology system 252, a heat source 234 (for example, a heat lamp) to raise the temperature of the feed material without fusing the material, an energy source 260 (for example, a laser system) to fuse the feed material, and a second metrology system 250. Printing components can be added or the existing printing components can be rearranged to allow the printhead module to perform the additive manufacturing process bi-directionally, i.e., in both left to right or right to left direction.

Figure 3:
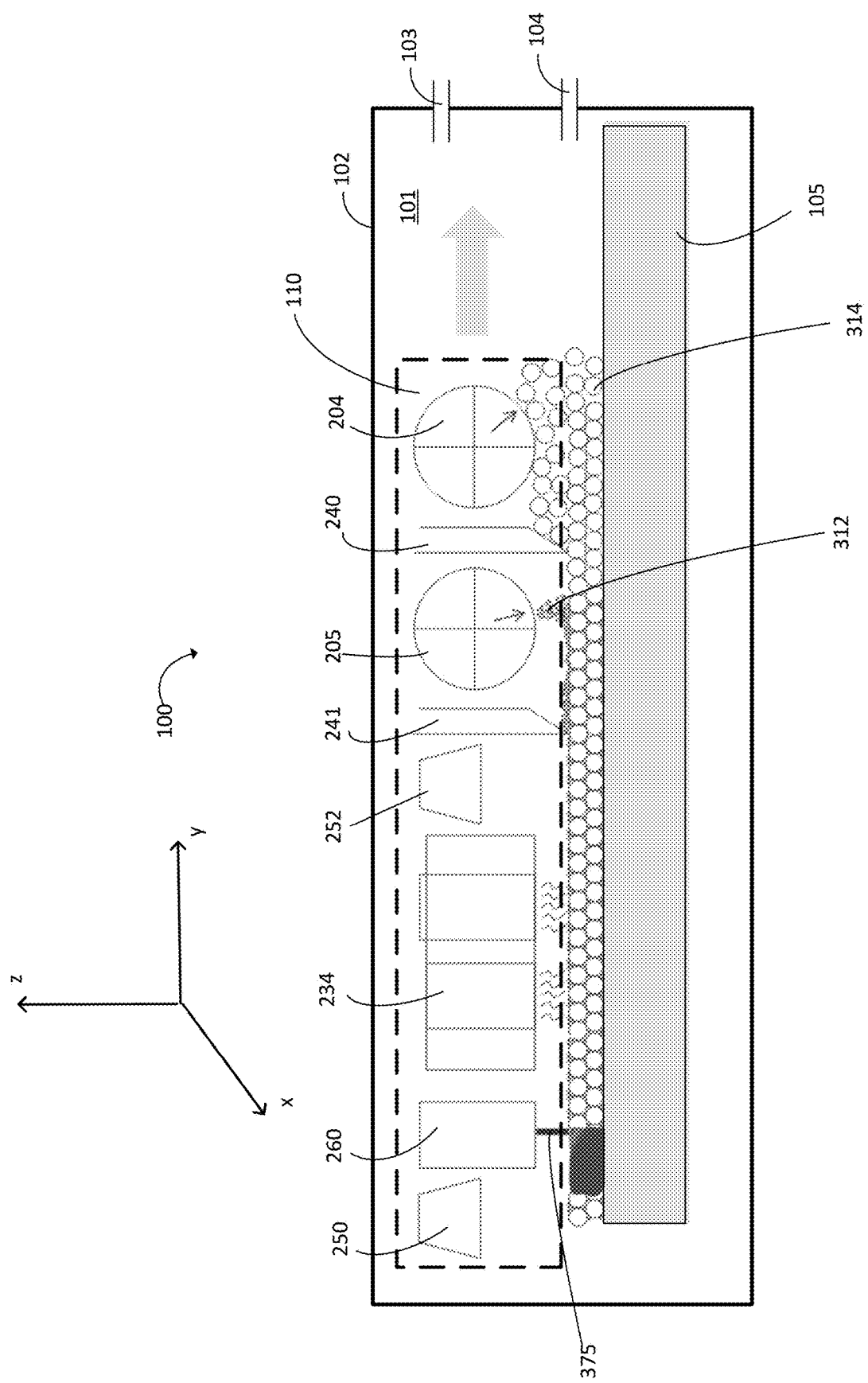
FIG. 3 illustrates a side view of the printhead module described in FIG. 2.

FIG. 3 is a schematic illustration of the printhead module 110 performing the additive manufacturing process. The printhead module 110 can move over the platen 105 (for example, along y-axis) and perform the additive manufacturing process. The various printing component of the printhead module are arranged along the direction of the additive manufacturing process (for example, along +y direction). Additionally, in some implementations the printing component can move (for example, by an actuator or a motor) relative to the frame of the module 110, e.g., along the x-axis. In what follows, the printing component will be described in the order in which they perform the additive manufacturing process on a given strip of deposited feed material under the printhead module 110.

The printhead module includes the first dispenser 204 (which is on the leading edge of the printhead module 110) that deposits a first feed material 314. The first spreader 240 (for example, a roller or a blade) follows the printhead module 204 and disperses/smooths the deposited feed material evenly across the platen 105.

An optional second dispenser 205 can follow the first spreader 240 to deposit a second feed material 312. Feed materials 312 and 314 can be of different sizes, and/or can have different melting temperatures and materials compositions. For example, the second feed material 312 can be smaller than the first feed material 314, and may therefore fill the interstitial spaces between the particles of feed material 314. In another implementation, the feed materials 312 and 314 can have the same size and sintering temperature, but can be deposited to increase the amount of feed material deposited per unit area. This will be discussed in greater detail later. The second feed material dispenser 205 is followed by an optional second spreader 241 (for example, a roller or a blade) that disperses/smoothens the deposited feed materials 312 and 314.

The feed material can be a powder. For example, the feed material can be a powder of particles composed of metal, such as, for example, steel, aluminum, cobalt, chrome, and titanium, alloy mixtures, ceramics, composites, or green sand.

An optional metrology system 252 can follow the spreader 241, and can comprise one or more of a profilometer, a thermal imager or an optical camera. It can, for example, measure the surface roughness of the deposited feed materials. Knowing the roughness of deposited feed material before fusing/melting the feed materials can help in improving the quality of the additive manufacturing process by controlling the manufacturing process.

Next is a heat source 234 to raise the temperature of the deposited feed material. In the embodiment described in FIG. 3 the heat source 234 is a heat lamp array. The heat lamp array 234 can heat the deposited feed material 312 (and 314 if present) to a temperature that is below its/their sintering or melting temperatures.

After the heat source 234 is an energy source 260 to fuse selected portions of the layer, e.g., by raising the temperature above its sintering temperature or melting temperature (and then permitting the portion to cool). For example, the energy source 260 can emit a beam 375. The beam 375 can, for example, be a laser beam generated by a laser, an ion beam generated by an ion source, or an electron beam generated by an electron gun. The beam 375 can raise the temperature of one or both of the deposited feed materials above their respective melting points. Energy source 260 can also produce multiple beams 575 that can melt the feed material.

Moreover, the energy source 260 can be selectively activated in order to selectively fuse desired regions of the deposited feed material. For example, the energy source 260 can emit the beam 375 that impinges a certain portion of the layer, thereby melting one or both the feed material deposited in that portion. Selective heating of certain portions of the feed material by the energy source 260 can be achieved by moving the energy source 260 relative to the printhead module frame, or by moving the beam 375 over the feed material, or both, in conjunction with selective activation of the energy source 260.

For example, the energy source 260 can move along a direction (e.g., the x-axis) perpendicular to the motion of the printhead module (e.g., the y-axis) by a motor or an actuator that is controlled by the controller 190 (see FIG. 1A). In another example, the energy source 260 may not move relative to the printhead module frame. However, the energy source 260 may include a mechanism, for example, a mirror mounted on a galvo or a piezoelectric micromirror device, which can deflect the beam 375 along the direction perpendicular to the direction of motion of the printhead module. The micromirror device may include a linear array of mirrors that are arranged along the direction perpendicular to the direction of motion of the printhead module. In all the aforementioned cases, the position of impingement of the beam 375 relative to the feed material changes.

Where two feed materials with different melting or sintering temperatures are used, the energy source 260 can raise the entire portion of the layer below the printhead module 110 to a temperature between the melting or sintering temperatures of the first feed material and the second feed material. Thus, only one of the feed materials will be fused. This eliminates the need for selective fusing by the energy source 260.

An optional second metrology system 250 follows the energy source 260. The second metrology system 250 can, for example, measure the properties (temperature, surface roughness etc.) of the melted feed material. This can be used by the controller to adjust the process parameters to improve the quality of the additive manufacturing process.

Figure 4A:
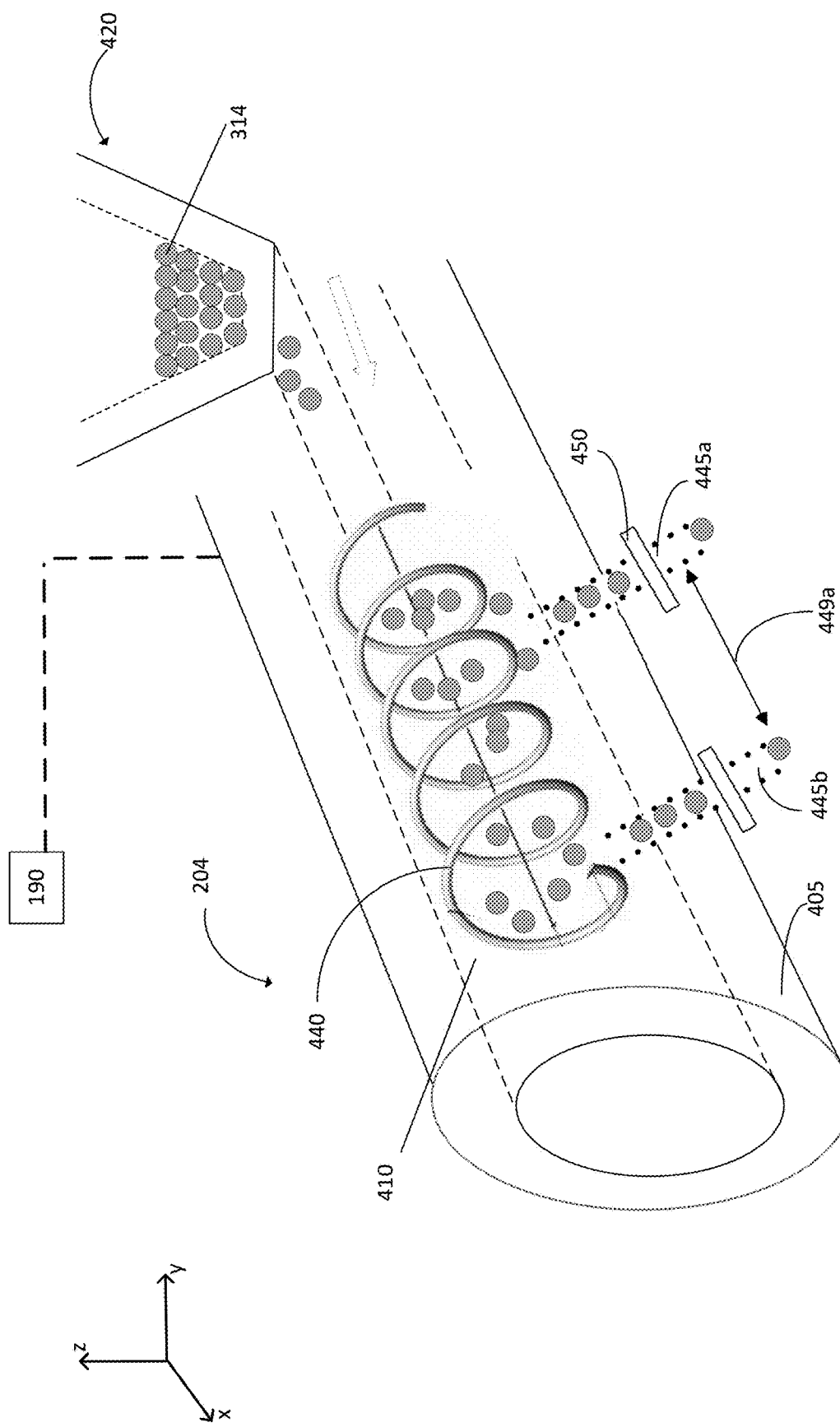
FIG. 4A illustrates a perspective view of a feed material dispenser.

FIG. 4A is a schematic illustration of an example dispenser that can be used for the feed material dispenser 204 described in FIGS. 2 and 3. The dispenser 204 includes a conduit 405 (for example, a hollow cylinder) that extends across the width of the platen (along x-axis) which is substantially perpendicular to the direction in which the printhead module moves (along y-axis) during the additive manufacturing process. The conduit 405 is coupled to a hopper 420 which stores the feed material 314. The conduit 405 encloses a hollow space 410 and an auger 440. The auger 440 is rotatably mounted to the material dispenser 204, and a motor can rotate the auger 440, for example, by a drive shaft.

As the auger 440 rotates, it draws in feed material 314 from the hopper 420. The conduit 405 can have a plurality of openings 445*a-b* arranged along its length (along x axis) from which the feed material 314 can be dispensed onto the platen. The conduit 405 can have more than two openings that can be spaced apart by a distance 449*a*. The rate of flow of the feed material 314 through the openings 445*a-b* can be regulated by an actuator 450 which can be controlled by a controller 190. The rate of flow of feed material can also be controlled by changing the rate of rotation of the auger or by replacing the auger by another auger that can allow for greater feed material flow. For example, increasing the rate of rotation of the auger can increase the rate at which feed material is dispensed and vice-versa. In other examples, the conduit can have a continuous slot along the length of the conduit (along x axis).

The some implementations, the dispenser 204 can have two hoppers, which can be located at the opposite ends of the hopper.

The dispenser 204 can be configured to dispense the feed material beyond the edge of the module 110. For example, the dispenser could include an ejector that ejects the feed material in a fluid carrier through nozzles, and the nozzles could be positioned at an angle relative to the platen surface such that the feed material is dispensed on a portion of the platen that lies beyond the extent of the dispenser in the x direction. This feature can be useful to deposit the feed material in regions of the platen that are not directly under the dispenser 204. This ensures, for example, that if there is a gap between two adjacent printhead modules of a printhead platform, feed material will be deposited on the portion of the platen that lies underneath the gap. Also, this ensures that the feed material can be deposited to a part of the platen that is not directly underneath a printhead module, for example, regions close to the edge of the platen.

Alternatively or in addition, the dispenser 204 can be configured to deliver more feed material to at the edges of the printhead module 110 (along the x-direction) than at the center of the printhead module. For example, the holes at the two ends of the conduit 405 (along the x-direction) can be larger than the holes at the center of the conduit 405. A spreader 340, e.g., a blade or roller, can then be used to spread the extra feed material into the gap between two adjacent printhead modules of the printhead array.

Figure 4B:
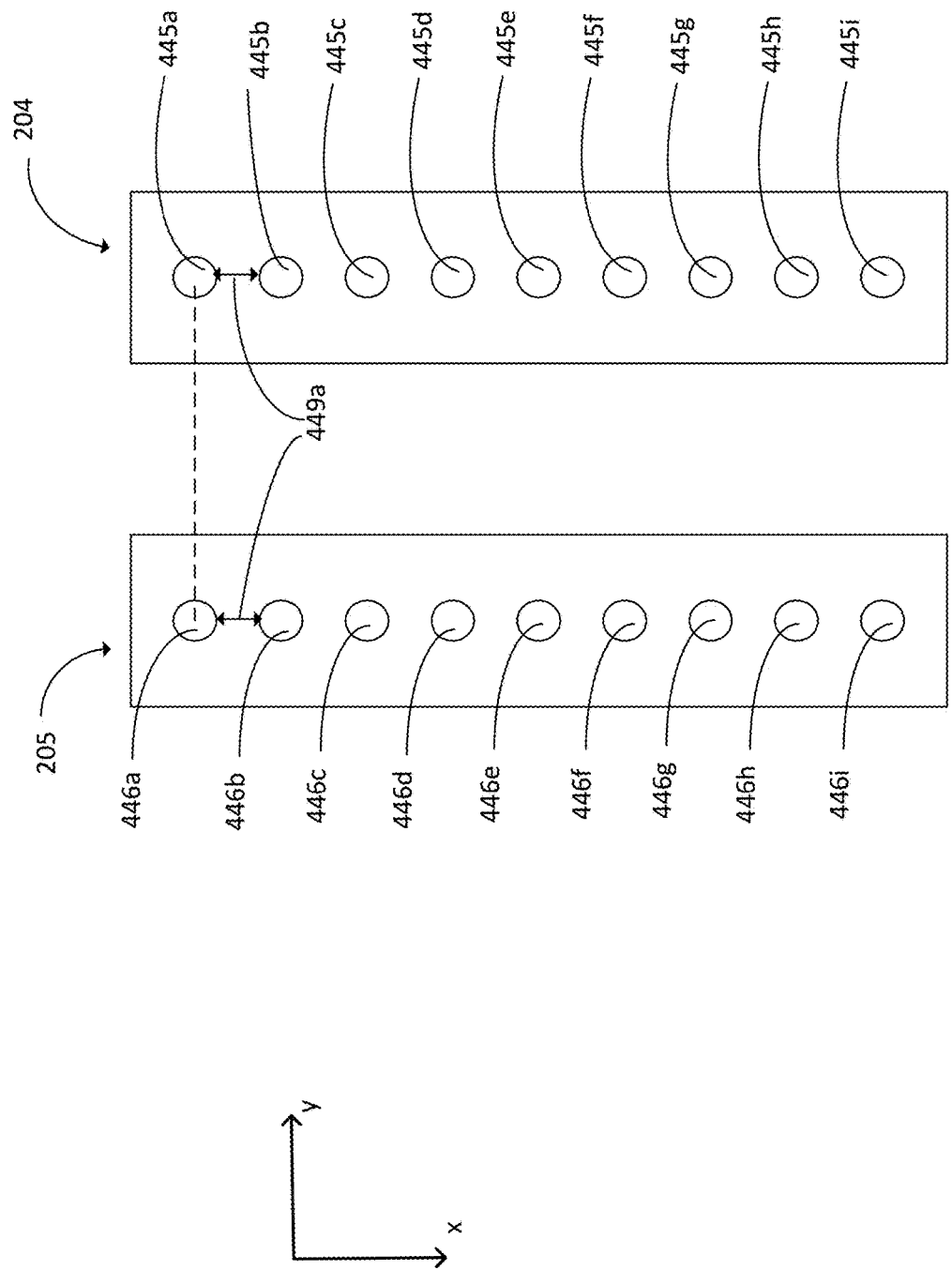
FIG. 4B illustrates feed material dispensers that are laterally aligned.
Figure 4C:
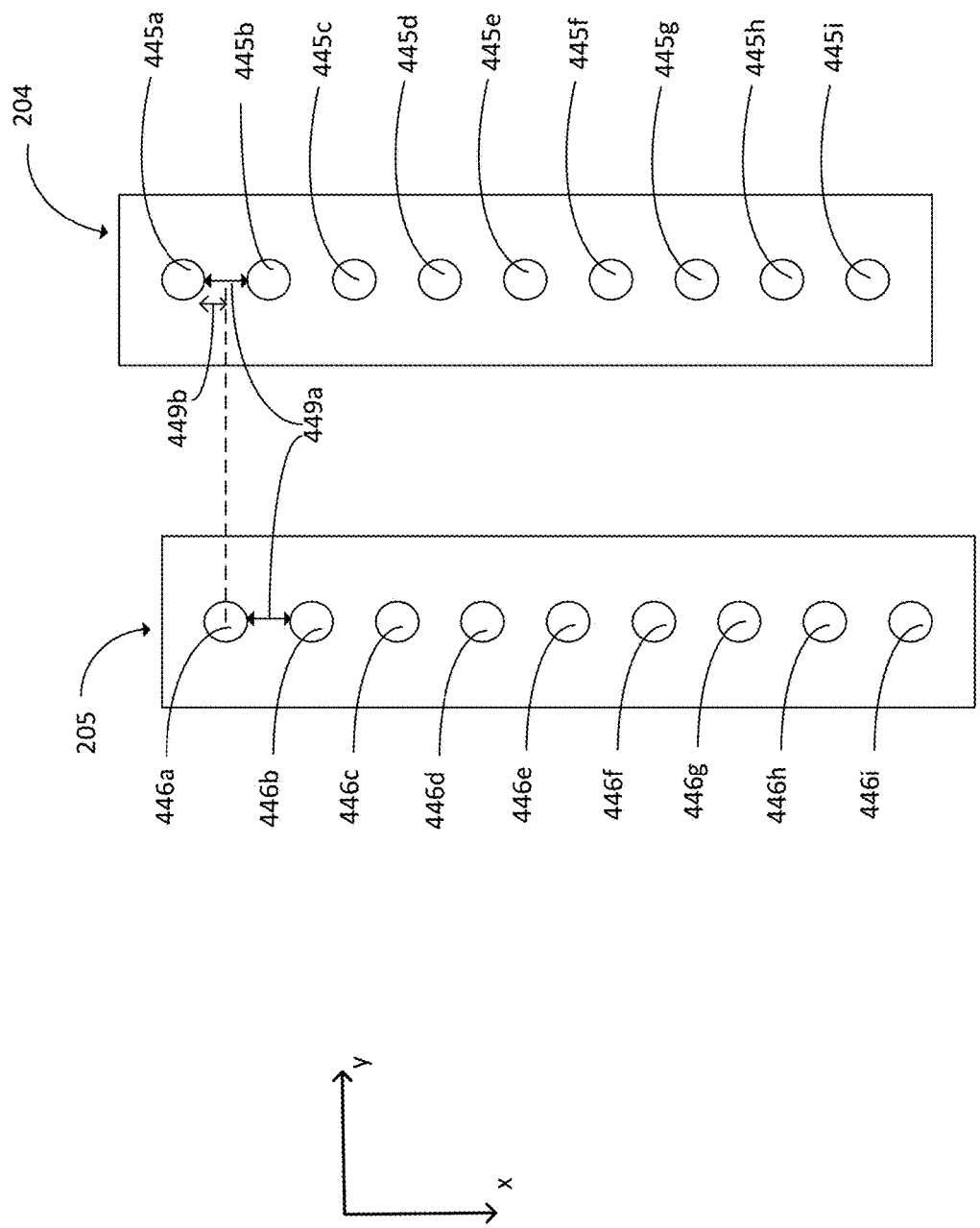
FIG. 4C illustrates feed material dispensers that are laterally displaced.

FIGS. 4B and 4C illustrate two ways of arranging feed material dispensers in a printhead array. The dispensers 204 and 205 can be arranged such that the openings of the dispensers are laterally aligned (along x-axis) as shown in FIG. 4B, or laterally displaced (along x-axis) as shown in FIG. 4C. The openings 445a-i of dispenser 204 are spaced apart by a distance 449a. The openings 446a-i of dispenser 205 are also spaced apart by a distance 449a. In one implementation (as described in FIG. 3), the two dispensers can belong to a printhead module 110 which is removably attached to the platform 150 (for example, dispensers 204 and 205 in FIG. 3). In another implementation, the two dispensers can belong to different printhead modules (see FIGS. 5C and 5D). that are removably attached to the platform. In yet another implementation, one or both dispensers can be included as global printing components of the printhead platform 150.

In FIG. 4B, the openings 445a-i of dispenser 204 and openings 446a-i of dispenser 205 are laterally aligned. Because the openings of dispensers 204 and 205 are spaced apart by the same distance 449a, aligning 445a with 446a ensures that the openings 445a-i and 446a-i are aligned. In the implementation described in FIG. 4B, the dispenser 204 is configured to deliver feed material 314 through the openings 445a-i, and the dispenser 205 is configured to deliver feed material 315 through the openings 446a-i. The feed materials 314 and 315 are stored in hoppers associated with the respective dispensers. For example, the feed material 314 is stored in hopper 420 (see FIG. 4A).

Feed materials 314 and 315 can have different particle size. For example, feed material 314 can be bigger than feed material 315 or vice versa. Alternatively or in addition, feed materials 314 and 315 can have different material compositions.

The arrangement of dispensers 204 and 205, as illustrated in FIG. 4B, can allow deposition of feed materials 314 and 315 that have the same material composition but have different particle size. For example, feed material 314 can be first deposited, followed by the deposition of feed material 315, which has smaller particle size compared to that of feed material 314. Feed material 315 can fill the interstitial gaps between the feed material 314 particles. Such an implementation can lead to smoother surfaces of an object that is being manufactured by the additive manufacturing process.

In some implementations, the feed material 315 is dispensed to every voxel where the feed material 314 is dispensed. In other implementations, where the openings are individually controllable, the controller can be configured to cause the dispenser 204 to dispense the first feed material into a plurality of voxels and to cause the corresponding second dispenser 205 to dispense the second feed material into a subset of the plurality of voxels into which the first dispenser dispensed the first feed material. For example, the smaller particles can be dispensed just in regions that correspond to the surface of the object being fabricated.

In other implementations, dispensers 204 and 205 of FIG. 4B can dispense feed materials 314 and 315 of different material composition. The flow of feed materials from the openings 445a-i and 446a-i can be regulated, for example, by actuators 450 that are controlled by controller 190 (see FIG. 4A). This can allow delivery of feed material 314 and 315 in different regions of the platen 105. For example, the two feed materials can be dispensed in complementary patterns so that all of the build area is covered by some material. For example, the controller can be configured to cause dispenser 204 to dispense the first feed material into a plurality of voxels and to cause the corresponding dispenser 205 to dispense the second feed material into voxels into which the first dispenser did not dispense the first feed material.

The feed materials 314 and 315 can have different sintering temperatures, for example, the sintering temperature of feed material 314 is greater than that of feed material 315. Therefore, heating a layer of feed material to a temperature that is above the sintering temperature of feed material 315 but below that of feed material 314 will lead to sintering of feed material 315 which can be supported by unsintered feed material 314. This permits the energy source to be configured to raise the temperature simultaneously of all of a strip of the feed material along the x-axis. That is, selective application of energy by the energy source is not required.

In FIG. 4C, as mentioned before, the openings 445a-i of dispenser 204 and openings 446a-i of dispenser 205 are laterally displaced relative to one another. For example, the openings 446a-i can be displaced relative to the openings 445a-i, along the x-axis, by a distance 449b. In some implementations, the openings 446a-i are aligned with the midpoints between the openings 445a-i. The distance 449b can, for example, be half of the distance 449a.

If the dispenser 204 and 205 are configured to deposit the same feed material (for example, 314 or 315), the implementation described in FIG. 4C can double the amount of feed material deposited per unit length of the dispenser along the x-axis. This can improve the resolution and uniformity of the additive manufacturing process.

FIGS. 5A-D describe various configurations for arranging printing components in the printhead modules 110, and the various configurations for arranging printhead modules 110 and global printing components in the platform. These configurations can improve the quality of the additive manufacturing process, allow for larger build bed size, and decrease the time of additive manufacturing process.

Figure 5A:
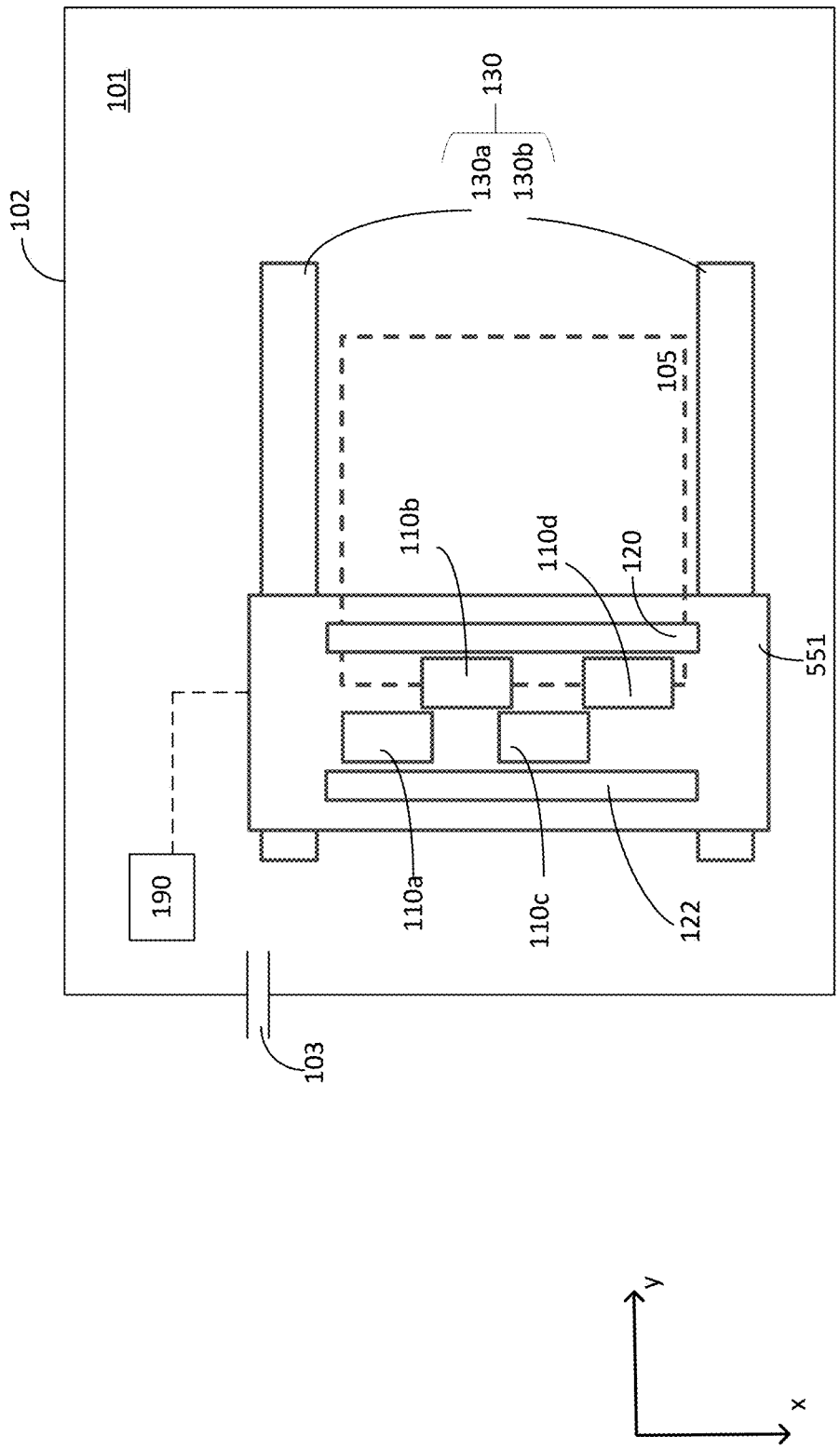
FIGS. 5A-D illustrates various arrangements of printhead modules and printing components on printhead platform.

FIG. 5A describes an additive manufacturing system with a staggered arrangement of printhead modules 110a-d in a platform 551. In a staggered arrangement, modules that are adjacent to each other along the x-axis (for example, modules 110a and 110b) are displaced along the y-axis. As the platform 551 slides along the y-axis, the printhead modules 110a-d carry out additive manufacturing process on regions that form parallel stripes across the platen 105. As noted above, if a dispenser has controllable openings, then the layer of feed material can be deposited in a desired pattern within the stripe associated with the printhead module.

In some implementations, adjacent printhead modules (for example, modules 110a and 110b) can overlap each other along the x-axis. As a result the deposited feed material on which modules 110a and 110b carry out the additive manufacturing process can overlap. Each of the printhead modules 110a-d can include a dispenser to dispense feed material on the platen. The regions on the platen 105 on which the dispensers in adjacent printhead modules can deposit feed material can overlap.

Where the dispensing regions overlap along the x-axis, several techniques are available to avoid having the feed material be too thick in the overlapping region. First, a spreader, positioned after the printhead modules and stretching across the overlapping region, can be used to spread out the feed material more uniformly. Second, assuming that the dispenser includes independently controllable openings, the controller can be configured such that only one of the dispensers delivers material into any voxels in the overlapping region. Third, the dispensers can be configured to have a lower flow rate at in the overlapping region. For example, openings in the dispenser at the edge (along the x-axis) can be smaller so less feed material flows through. These techniques can be used in combination.

In another implementation of the system described in FIG. 5A, the adjacent modules 110a-d do not overlap each other along the x-axis. As a result, there are regions on the platen 105 that are not directly below any module. In order to carry out additive manufacturing process in such regions, feed material needs to be dispensed onto them by modules that are adjacent to that region.

Again, several techniques are available to avoid having the feed material be too thin or absent from the gaps between the dispensers. First, a spreader, positioned after the printhead modules and stretching across the overlapping region, can be used to spread out the feed material and force it into the gaps. Second, as described in FIG. 4A, dispenser 204 in printhead modules can be configured to deposit feed material beyond the edge of the module, for example, by using an ejector. Third, the dispenser 204 can be configured to deposit more feed material at the edge of the printhead module than away from the edge. For example, openings in the dispenser at the edge (along the x-axis) can be larger so more feed material flows through at the area adjacent the gap. Fourth, assuming the dispenser includes independently controllable openings, the controller can be configured such that the dispensers deliver material at an increased rate. These techniques can be used in combination. As a result, modules 110a-d that include dispenser 204 with the aforementioned configurations can dispense feed material in regions that are not directly underneath a printhead module. The controller 190 can determine the amount of feed material to be deposited by the various openings 445a-i.

As the printhead platform 551 described in FIG. 5A slides from left to right (along +y-axis), the first global printing component 120 is at the leading edge of the platform, followed by modules 110a-d and global printing component 122 at the trailing edge of the platform. The first global component 120 can, for example, include a metrology system that can detect the temperature, or roughness, or both of the surface on which the additive manufacturing process takes place. As described before, each of the printhead modules 110a-d include a feed material dispenser (for example, feed material dispenser 204 described in FIG. 4A) to deposit a feed material. The printhead modules can also include a spreader (for example, a roller or a blade 240/241) and a heat source (for example, heat lamp 234) to heat the deposited feed material. The heat source is configured to heat the feed material to a temperature that is below the fusing temperature of the feed material.

The global printing component 122 can include a global spreader to spread the deposited feed material. A global spreader is particularly useful for spreading feed material over regions that are not directly below one of the modules 110a-d and therefore not accessible by spreaders that that included in the printhead modules.

In addition to a global spreader, component 122 also includes an energy source that fuses, e.g., sinters, the deposited feed material. The second energy source can, for example, be similar to the energy source 260 that can emit a beam 375 (for example, a laser, ion or electron beam) that can sinter desired portions of the deposited feed material (for more detail of the working of the energy source 260, refer to FIG. 1B).

The global printing component 122 can also include a coolant dispenser to dispense coolant fluid on the fused feed material. Additionally, component 122 can also include a metrology equipment to measure the temperature and surface roughness of the sintered feed material.

The various printing components included in the modules and the global printing components 120 and 122 can be controlled by a controller 190. For example, the controller 190 can control the actuators 450 that regulate the flow of feed materials from the openings 445a-i of the dispenser 204 (see FIGS. 4A-C). The controller 190 can also control the energy provided to the feed material by the heat lamp 234. Additionally, the controller 190 can control energy source 260 to sinter desired portions of the deposited feed material. This can be achieved, for example, by directing beam 375 at the portion of the feed material that need to be sintered. The controller 190 can receive inputs from the various metrology systems included in the platform 551 and control the various printing components in the platform 551 based on the input. For more details on the functioning of the controller can be found in FIG. 1B.

Figure 5B:
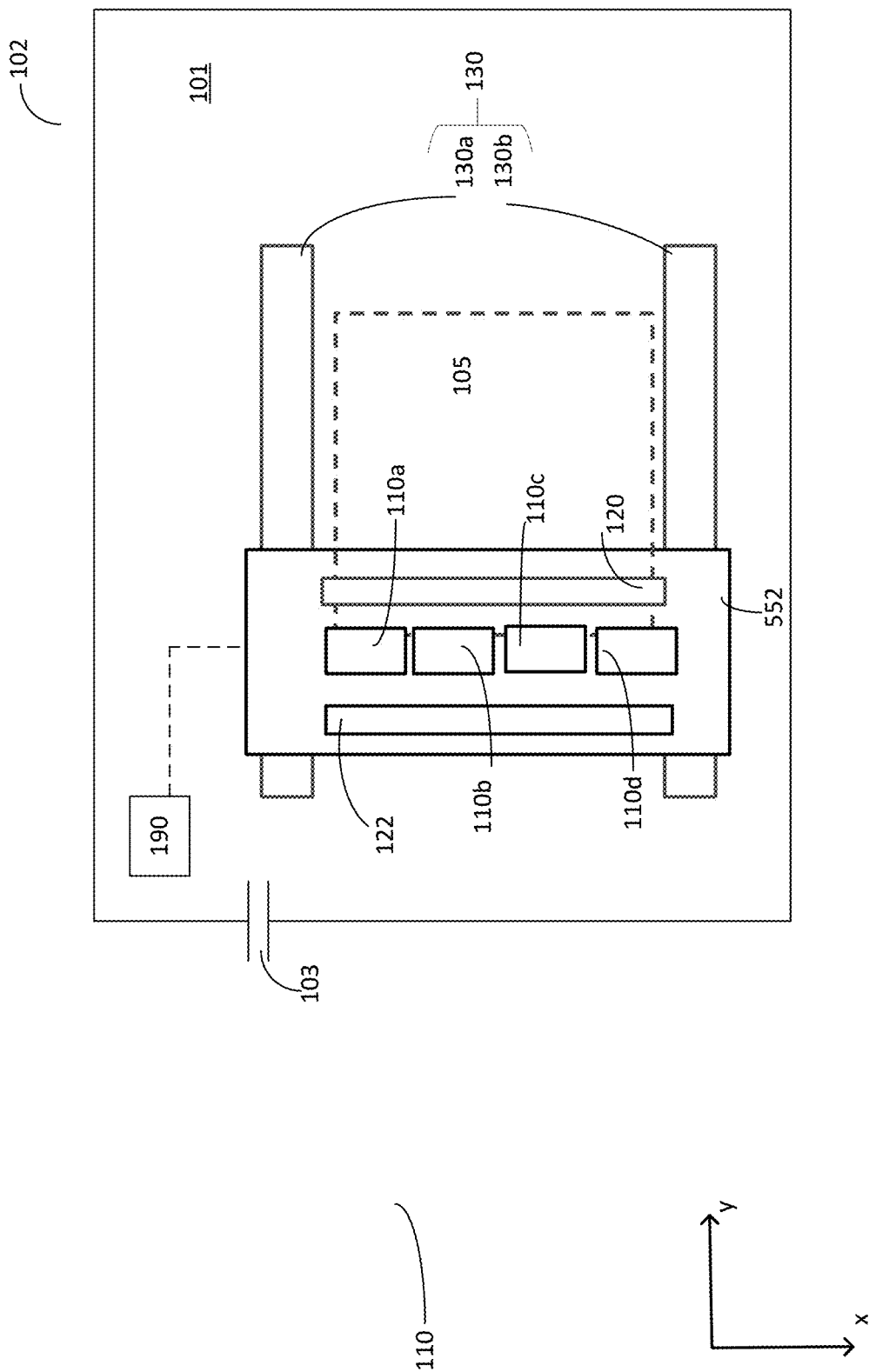

FIG. 5B illustrates another implementation of an additive manufacturing system in which the printhead modules 110a-d are arranged in a side-by-side configuration. In a side-by-side configuration, printhead modules 110a-d are arranged along the x-axis (i.e., they are not displace relative to one another along the y-axis) and can span the width of the platen 105. The adjacent modules, for example, modules 110a and 110b, are separated by a gap.

As the platform 552 slides along the y-axis, each printhead module carries out additive manufacturing process on a stripe-shaped region across the platen. As noted above, if a dispenser has controllable openings, then the layer of feed material can be deposited in a desired pattern within the stripe associated with the printhead module. The regions of the platen 105, which lie under the gaps between the adjacent modules, receive feed material from the dispensers in the adjacent modules. The mechanism of dispensing feed material is similar to that described in FIG. 5A.

The various techniques described with reference to FIG. 5A to compensate for a gap between dispensers can be used for the implementation of FIG. 5B. For example, the dispensers (for example, dispenser 204) in the modules 110a-d can be configured to deposit feed material beyond the edge of the module. This can be done, for example, by using an ejector. Alternatively, the dispenser 204 can deposit more feed material at the edge of the printhead module than at away from the edge. The extra feed material deposited at the edge can be spread by a global spreader included in the global printing component 122. Global printing component 120 and 122 perform manufacturing processes similar to those described in FIG. 5A. Also, as described for the implementation in FIG. 5A, a controller 190 can receive inputs from the various metrology systems in the platform 552 and can control the printing components in the platform 552 to regulate the manufacturing process.

With proper machining, the gap can be small and the modules can positioned with tight tolerance, e.g., the gap can be less than the distance between apertures in the dispenser. In this case, some of the techniques to compensate for the gap may not been needed.

Figure 5C:
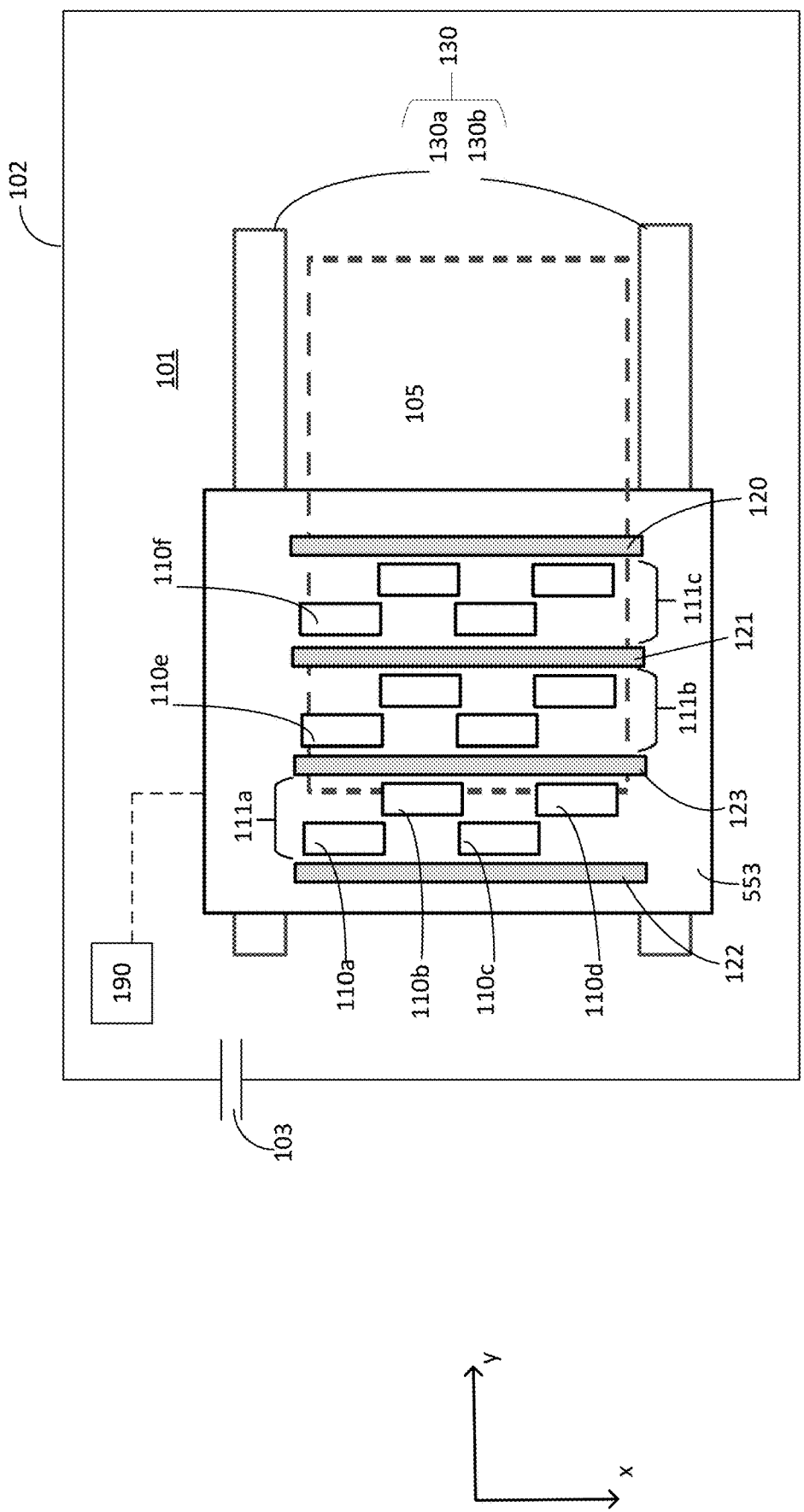

FIG. 5C describes another implementation of additive manufacturing system where multiple staggered arrangements 111a-c of printhead modules (for example, staggered arrangement described in FIG. 5A) are arranged along the y-axis. Within each arrangement, the printhead modules are spaced along the x-axis As described in FIG. 5A, in each staggered arrangement, the adjacent modules (for example, modules 110a and 110b) can either be separated by a gap or can overlap one another along the x-axis. Each module carries out additive manufacturing process on a stripe-shaped region across the platen as the platform 553 slides along the y-axis. As noted above, if a dispenser has controllable openings, then the layer of feed material can be deposited in a desired pattern within the stripe associated with the printhead module.

Printhead modules in the staggered arrangement 111a-c can carry out manufacturing process over the same rectangular strip of feed material as the platen 553 slides along the y-axis. For example, modules 110a, 110e and 110f of staggered arrangements 111a, 111b and 111c, respectively, can carry out additive manufacturing over the same strip of feed material that stretches along the y-axis. Modules 110a, 110e and 110f can each include a dispenser that can deposit the same or different feed material onto the platen. For example, module 110a can include the dispenser 204 and module 110e can include the dispenser 205 (see FIGS. 4B and 4C). As described in FIGS. 4B and 4C, dispensers 204 and 205 can dispense feed materials 314 and 315, respectively, which can have the same material composition but different particle size, or different material composition. Alternatively, dispensers 204 and 205 can dispense the same feed material (for example, feed material 314).

Moreover, the dispensers 204 and 205 can either be laterally aligned, as described in FIG. 4B, or laterally displaced as described in FIG. 4C. If the dispensers 204 and 205 are laterally aligned, the openings 445a-i of dispenser 204 and openings 446a-i of dispenser 205 can dispense feed material in the same region of the platen 105. For example, as the platform 553 slides along the y-axis, openings 445a and 446a can deposit the respective feed materials along the same strip on platen 105 that extends along the y-axis. Similarly, each pairs of openings (445b/446b, 445c/446c, etc.) can deposit the respective feed material over a given strip on the platen 105.

As described with respect to FIG. 4B, if the feed materials 314 and 315 have the same material composition but different particle sizes, the end product of the manufacturing process can have smoother surfaces.

If the feed materials 314 and 315 have different material composition with different sintering temperatures, the feed material with the higher sintering temperature can support the feed material with the lower sintering temperature which is fused to form the object that is being manufactured.

If the dispensers 204 and 205 are laterally displaced, as described in FIG. 4C, the dispensers 204 and 205 can dispense double the amount of the same feed material (for example, feed material 314 or 315) per unit length. This can improve the resolution of the additive manufacturing process.

Platform 553 can also include global printing components 120-123. Global printing component 120 is at the leading edge of the platform 553 (assuming that platform is moving from left to right along+y direction) and global printing component 122 is at the trailing edge of the platform). Global printing component 121 and 123 lie between the staggered arrangements of printhead modules. Printing component 120 can include a metrology system that can detect the temperature, or roughness, or both of the surface on which the additive manufacturing process takes place. The printing components 121, 122 and 123 can include spreaders, for example, rollers or blade, to spread the feed material deposited by the dispensers that precede them. Printing components 121 and 123 can include a heat source, for example, a heat lamp 234, which can raise the temperature of the deposited feed material to a temperature below the sintering temperature of the feed material/materials. The trailing printing component 122 include an energy source 260 that can sinter desired portions of the feed material as described in FIGS. 1B, 5A and 5B.

Also, as described for the implementation in FIGS. 1B and 5A, a controller 190 can receive inputs from the various metrology systems in the platform 553 and can control the printing components in the platform 553 to regulate the manufacturing process.

Figure 5D:
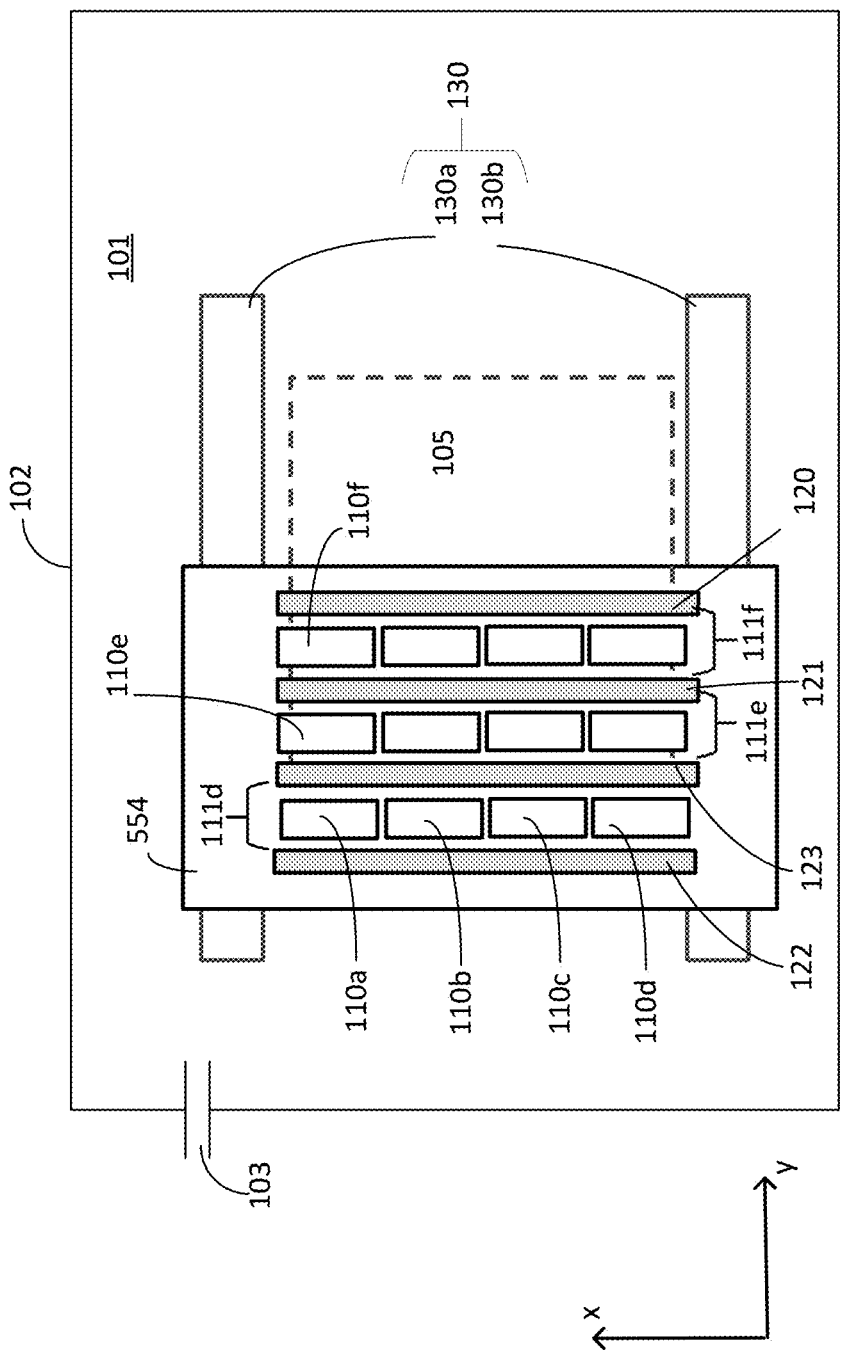

FIG. 5D describes another implementation of additive manufacturing system where multiple side-by-side arrangements 111d-f of printhead modules (for example, as described in FIG. 5B) are arranged along the y-axis. As described in FIG. 5B, in each side-by-side arrangement, the adjacent modules (for example, modules 110a and 110b) are separated by a gap. Each module carries out additive manufacturing process on a stripe-shaped region on the platen as the platform 554 slides along the y-axis. As noted above, if a dispenser has controllable openings, then the layer of feed material can be deposited in a desired pattern within the stripe associated with the printhead module.

Printhead modules in the side-by-side arrangements 111d-111f can carry out manufacturing process over the same stripe-shaped region as the platen 554 slides along the y-axis. For example, modules 110a, 110e and 110f of side-by-side arrangements 111a, 111b and 111c, respectively, can carry out additive manufacturing over the same strip of feed material that stretches along the y-axis. As described in FIG. 5C, modules 110a, 110e and 110f can each include a dispenser that can deposit the same or different feed material onto the platen. For example, module 110a can include the dispenser 204 and module 110e can include the dispenser 205 (see FIGS. 4B and 4C). The dispensers 204 and 205 can be aligned or laterally displaced, and can deposit same or different feed materials (see FIG. 5C for the various configurations of feed material/materials deposition). The global printing component 120, 121, 122 and 123 perform similar function as those describe in FIG. 5C. The global dispensers that are included in printing components 121, 122 and 123 spread the feed material in the region of the platen that do not lie directly below a printhead module.

Also, as described for the implementation in FIG. 5A, a controller 190 can receive inputs from the various metrology systems in the platform 554 and can control the printing components in the platform 554 to regulate the manufacturing process.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

The controller 190 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 190 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 190, e.g., as controlled by firmware or software, can interpret the data object received from the computer to generate the set of signals necessary to control the components of the apparatus 100 to fuse the specified pattern for each layer.

The controller 190 can be configured to divide data representing voxels of a layer in a 3D model into a first data representing a first plurality of parallel strips of voxels corresponding to the first plurality of openings and second data representing a second plurality of parallel strips of voxels interleaved with the first plurality of parallel strips and corresponding to the second plurality of openings and to control the first plurality of openings based on the first data and control the second plurality of openings based on the second data.

It is desirable to have a standardized printhead module that includes various printing components, for example, a feed material dispenser, a heat source and an energy source. "Standardized" in this context indicates each printhead module is substantially identical (there can be software exceptions such as serial number or firmware version that vary between dispensers). The standardized printhead module simplifies construction and repair of additive manufacturing systems, e.g., the printhead may be operable as a "plug and play" module that would be operable in any compatible additive manufacturing system. A standardized printhead configuration can also enable scaling of additive manufacturing systems to accommodate the size of the object to be fabricated.

The printhead module can move relative to the platen, for example, along the x, y and z Cartesian axes, during the manufacturing process. The platen can be configured to be immovable, i.e., the platen may not move either in the x-y plane or along the z-axis.

A number of implementations have been described. Nevertheless, it will be understood that various modifications may be made. For example, Rather than the printhead support 150 moving, the printhead support can remain stationary while the platen 105 moves laterally to provide the relative motion between the printhead assembly and the platen.

The individual openings in the dispenser need not be independently controllable. For some applications, e.g., where the energy source is selective, it may be sufficient to simply use the dispenser to distribute across the array.

Various components described above as being part of the printhead, such as the dispensing system(s), spreader (s), sensing system(s), heat source and/or energy source, can be mounted on the support, e.g., the platform 150, instead of in the printhead, or be mounted on the frame that holds the support.

For z-axis motion, the horizontally moving component can be supported on the vertically moving component, or vice versa.

Rather than having a printhead module, the dispenser and energy source could be directly mounted on the support, e.g., on the platform 150.

Accordingly, other implementations are within the scope of the claims.

What is claimed is:

1. An additive manufacturing system, comprising:
a platen having a top surface to support an object being manufactured, wherein the platen has a build width;
a support structure;
an actuator coupled to at least one of the platen or the support structure to create relative motion there between along a first axis parallel to the top surface;
a plurality of printheads mounted on the support structure, each printhead including a dispenser to deliver powder simultaneously in an elongated dispensing area extending along a second axis perpendicular to the first axis, each dispenser including a plurality of independently controllable openings for delivery of powder, the plurality of openings arranged along the second axis, wherein the printheads are positioned side-by-side in a line along the second axis, wherein the printheads are spaced apart along the second axis such that dispensing areas of adjacent printheads in the line are separated along the second axis by a gap and such that during motion along the first axis the plurality of printheads selectively dispense the powder in a plurality of parallel swaths along the first axis;
a spreader to spread powder delivered by the adjacent printheads into the gap such that the plurality of parallel swaths of powder from the printheads span the build width;
an energy source including a laser to emit a laser beam configured to selectively fuse a portion of the powder that was selectively dispensed by the plurality of printheads;
a mirror to controllably position the laser beam on the powder; and
a controller configured to cause the each printhead to deliver a plurality of successive layers of powder over the platen with powder selectively dispensed to the plurality of layers, and to selectively activate the laser to cause the laser beam to selectively fuse the portion of the powder in the plurality of layers in a pattern to provide the object being manufactured.

2. The additive manufacturing system of claim 1, wherein the plurality of printheads includes a first printhead and a second printhead adjacent to the first printhead, wherein the first printhead includes a first dispenser and the second printhead includes a second dispenser, and wherein each of the first dispenser and second dispenser are configured to dispense powder at a higher rate at a first region adjacent the gap than at a second region farther from the gap.

3. The additive manufacturing system of claim 1, wherein the energy source comprises a plurality of energy sources, and where each respective printhead includes a respective energy source from the plurality of energy sources, the respective energy source configured to fuse the powder in the swath dispensed by the respective printhead.

4. The additive manufacturing system of claim 1, comprising a heat source configured to heat the powder to a temperature below a temperature at which particles of the powder fuse.

5. The additive manufacturing system of claim 4, wherein the heat source comprises a plurality of heat sources, and where each respective printhead includes a respective heat source from the plurality of heat sources, the respective heat source configured to heat the powder in the swath dispensed by the respective printhead.

6. The additive manufacturing system of claim 1, wherein the plurality of printheads comprises a first plurality of first printheads and a second plurality of second printheads, each first printhead including a first dispenser and each second printhead including a second dispenser, wherein the first plurality of first printheads are spaced along the second axis, wherein the second plurality of second printheads are spaced along the second axis and are spaced apart from the first plurality of first printheads along the first axis, and wherein each first dispenser of the first plurality of first printheads has a first dispensing region that overlaps a corresponding second dispensing region of a corresponding second dispenser of the second plurality of second printheads.

7. The additive manufacturing system of claim 6, wherein each first dispenser comprises a first plurality of apertures and each second dispenser comprises a second plurality of apertures.

8. The additive manufacturing system of claim 7, wherein the first plurality of apertures are aligned with the second plurality of apertures along the second axis.

9. The additive manufacturing system of claim 8, wherein the first dispenser comprises a reservoir to hold a first powder and the second dispenser comprises a reservoir to hold a second powder.

10. The additive manufacturing system of claim 9, wherein the powder has a first particle size and the second powder a second particle size smaller than the first particle size, and/or wherein the first powder and the second powder have different material compositions.

11. The additive manufacturing system of claim 9, wherein the controller is configured to cause the first dispenser to dispense the first powder into a plurality of voxels and to cause the corresponding second dispenser to dispense the second powder into voxels into which the first dispenser did not dispense the first powder.

12. The additive manufacturing system of claim 11, wherein the first powder has a first fusing temperature and the second powder has a different second fusing temperature.

13. The additive manufacturing system of claim 12, wherein the energy source is mounted to the support or a frame holding the support and the platen, and wherein the controller is configure to cause the energy source to fuse the powder after both the first powder and second powder are dispensed.

14. The additive manufacturing system of claim 9, wherein the controller is configured to cause the first dispenser to dispense the first powder into a plurality of voxels and to cause the corresponding second dispenser to dispense the second powder into a subset of the plurality of voxels into which the first dispenser dispensed the first powder.

15. The additive manufacturing system of claim 14, wherein the subset of the plurality of voxels are voxels at an edge of the object being manufactured.

16. The additive manufacturing system of claim 7, wherein the first plurality of apertures are aligned with spaces between the second plurality of apertures along the second axis.

17. The additive manufacturing system of claim 16, wherein each first dispenser includes a first plurality of independently controllable openings and each second dispenser includes a second plurality of independently controllable openings, and comprising a controller configured to control the openings of the first dispenser and the second dispenser.

18. The additive manufacturing system of claim 17, wherein the controller is configured to divide data representing voxels of a layer in a 3D model into a first data representing a first plurality of parallel strips of voxels corresponding to the first plurality of openings and second data representing a second plurality of parallel strips of voxels interleaved with the first plurality of parallel strips and corresponding to the second plurality of openings and to control the first plurality of openings based on the first data and control the second plurality of openings based on the second data.

19. The additive manufacturing system of claim 18, wherein the first dispenser comprises a first reservoir and the second dispenser comprises a second reservoir, and the first reservoir and second reservoir hold the same powder.

* * * * *